(12) United States Patent
Rey et al.

(10) Patent No.: US 10,704,650 B2
(45) Date of Patent: Jul. 7, 2020

(54) CYCLOIDAL REDUCER WITH HELICAL TOOTHING FOR POWER STEERING

(71) Applicant: JTEKT EUROPE, Irigny (FR)

(72) Inventors: Laurent Rey, Villeurbanne (FR); Jean-Michel Saniez, Aulnoy lez Valenciennes (FR)

(73) Assignee: JTEKT EUROPE, Irigny (FR)

( * ) Notice: Subject to any disclaimer, the term of this patent is extended or adjusted under 35 U.S.C. 154(b) by 20 days.

(21) Appl. No.: 16/096,633

(22) PCT Filed: Apr. 21, 2017

(86) PCT No.: PCT/FR2017/050944
§ 371 (c)(1),
(2) Date: Oct. 25, 2018

(87) PCT Pub. No.: WO2017/187056
PCT Pub. Date: Nov. 2, 2017

(65) Prior Publication Data
US 2019/0136946 A1    May 9, 2019

(30) Foreign Application Priority Data
Apr. 25, 2016 (FR) .................................... 16 53631

(51) Int. Cl.
*F16H 1/32* (2006.01)
*B62D 5/04* (2006.01)

(52) U.S. Cl.
CPC ............ *F16H 1/32* (2013.01); *B62D 5/0421* (2013.01); *F16H 2001/324* (2013.01)

(58) Field of Classification Search
None
See application file for complete search history.

(56) References Cited

U.S. PATENT DOCUMENTS

| 4,922,781 A * | 5/1990 | Peiji | F16H 55/08 74/462 |
| 8,157,691 B2 * | 4/2012 | Stanovskoy | F16H 1/08 475/180 |
| 2019/0047610 A1 * | 2/2019 | Rey | F16H 1/32 |

FOREIGN PATENT DOCUMENTS

| CN | 104 633 062 A | 5/2015 |
| EP | 0 286 760 A1 | 10/1988 |
| EP | 0 931 714 A1 | 7/1999 |
| EP | 2 960 546 A1 | 12/2015 |
| FR | 1 351 031 A | 1/1964 |

(Continued)

OTHER PUBLICATIONS

Aug. 2, 2017 International Search Report issued in International Patent Application No. PCT/FR2017/050944.

*Primary Examiner* — Dirk Wright
(74) *Attorney, Agent, or Firm* — Oliff PLC (57) ABSTRACT

A cycloidal gear pair reducer including an input shaft, mounted in a reducer casing such that it rotates about an axis referred to as "main axis", an eccentric member carried by the input shaft and rotated by the latter, at least one cycloidal disc rotatably mounted on the eccentric member and having a cycloidal toothing, at least one ring gear provided with a receiving toothing with which the cycloidal toothing of the cycloidal disc meshes, and an output shaft, separate from the input shaft, arranged to be rotated by the cycloidal disc; the cycloidal toothing of the disc and the corresponding receiving toothing of the ring gear being helical.

5 Claims, 3 Drawing Sheets

(56) References Cited

FOREIGN PATENT DOCUMENTS

| WO | WO-2017022061 A1 | * | 2/2017 | ............... | F16H 1/32 |
| WO | WO-2017022062 A1 | * | 2/2017 | ............... | F16H 1/32 |
| WO | WO-2017187056 A1 | * | 11/2017 | ............... | F16H 1/32 |

* cited by examiner

CYCLOIDAL REDUCER WITH HELICAL TOOTHING FOR POWER STEERING

The present invention concerns the general field of gear reducers, and more particularly the field of cycloidal gear reducers (more simply called cycloidal reducers), that ensure a transmission of movement between an input shaft and an output shaft, in order to perform a reduction in the rotational speed in favor of an increase in the transmitted torque.

The invention concerns more specifically the application of such reducers to a power steering system for a vehicle.

It is known to provide, within a power steering system, a gear reducer that ensures a transmission of movement between an assist motor, generally an electric assist motor, and a drive pinion that engages on a steering rack, so as to drive said rack in translation to change the steering angle of the steered wheels of the vehicle.

It is generally known to use for this purpose a worm wheel and a worm screw reducer.

This being the case, it has also been envisaged, in particular by the patent application EP-0 931 714, to use to the same end a cycloidal gear reducer, within which the input shaft drives, by means of an eccentric member, such as a cam, a disc which is provided with a cycloidal toothing and that meshes with a series of teeth formed by meshing pins which are implanted in circle in a crown forming a portion of a reducer casing. The output shaft, coaxial with the input shaft, is provided with a series of coupling fingers, each engaged in a circular orifice dug in the disc, so that the rotation of the disc under the combined effect of the cam and of the cycloidal toothing in turn allows rotatably driving the output shaft.

However, such an arrangement has some drawbacks, that explain why the known cycloidal gear reducers are, in practice, inadequate, and de facto discarded, in a number of applications, in particular when it is desired to concretely ensure a power and movement transmission within a power steering system.

Indeed, the known cycloidal reducers have first of all, because of the large number of parts that constitute them, among which in particular the multiple individual teeth (meshing pins) implanted in the crown as well as the multiple coupling fingers, a very complex structure, relatively heavy and bulky.

This multiplicity of component parts further makes said cycloidal reducers particularly long and expensive to manufacture.

Afterwards, the cycloidal gear reducers have, relative to the conventional gear reducers such as worm wheel and worm screw reducers, a low contact ratio, that is to say a small average number of teeth that are simultaneously engaged during meshing.

This low contact ratio tends to create some irregularities during the transmission of movement, irregularities that can result in jerks, shocks and operating noises.

Such irregularities are in addition likely to disturb the touch feeling of the driver when the latter maneuvers the steering system, which may be detrimental to the driving comfort, or even to the safety of the vehicle and its occupants.

Furthermore, the reduction ratio obtained by the cycloidal reducer described above, that is to say the ratio between the input speed and the output speed, is in practice relatively low.

However, the increasing requirements in terms of lightness and compactness that are imposed on the power steering systems lead to prioritize relatively low-power assist motors, certainly capable of producing a high rotational speed but providing however little torque, and therefore which should be assisted by a reducer having a high reduction ratio and a good mechanical efficiency.

The objects assigned to the invention consequently aim at overcoming the aforementioned drawbacks and at proposing a new type of simplified and compact cycloidal reducer that performs an efficient, smooth and uniform transmission of movement and that can be in particular suitable for driving a power steering mechanism.

The objects assigned to the invention are achieved by means of a cycloidal gear reducer comprising an input shaft, rotatably mounted in a reducer casing along an axis called «main axis» (ZZ'), an eccentric member carried by the input shaft and rotatably driven by the latter, at least one cycloidal disc which is rotatably mounted on said eccentric member and which is provided with a cycloidal toothing, at least one crown provided with a receiving toothing with which the cycloidal toothing of the cycloidal disc meshes, and an output shaft, distinct from the input shaft, which is arranged to be rotatably driven by the cycloidal disc, said reducer being characterized in that the cycloidal toothing of the disc and the corresponding receiving toothing of the crown are helical.

Advantageously, the implementation of a helical toothing, that is to say a toothing inclined by a predetermined helix angle relative to the axis of rotation of the concerned disc (respectively relative to the axis of the concerned crown), allows obtaining a more progressive and wider meshing of the cycloidal toothings, and consequently a higher gear contact ratio and a better distribution of the forces. The invention thus allows improving the smooth operation of the cycloidal gear, and more generally the smooth operation of the cycloidal reducer, compared to the known reducers.

In this regard, it should be noted that, within the known cycloidal reducers, the manufacture of a toothing from individual meshing pins added onto the crown has until now required the use of straight cylindrical pins, identical to each other, and was consequently incompatible with a shaping and an implantation of said pins in a helical geometry, which then required the implementation of a straight toothing, that suffers precisely from the defects detailed above.

Here, on the contrary, the helical cycloidal toothings of the reducer according to the invention can be formed integrally with the concerned disc, respectively with the concerned crown, for example by molding and/or cutting, which improves the robustness of said reducer and greatly simplifies the assembling of said reducer.

Moreover, the use of helical toothings is perfectly adapted to the production of a reducer comprising several consecutive cycloidal reduction stages, typically of a reducer with two reduction stages, which allows obtaining very high reduction ratios, while preserving a reduced bulk.

Other objects, characteristics and advantages of the invention will appear more detailed upon reading the following description as well as upon using the accompanying drawings, provided for purely illustrative and non-limiting purposes, among which.

The present invention concerns a cycloidal gear reducer 1, also called «cycoidal reducer» 1 (hereinafter «reducer» 1).

Such reducer 1 advantageously allows a transmission and a conversion of movement and/or force, and therefore a transmission and a conversion of mechanical power, between an input shaft 2 that receives the motive power to be transmitted and an output shaft 3 that transmits said motive power downstream of the reducer 1.

The term «reducer» 1 can designate here indifferently either a mechanism actually intended to perform a reduction, that is to say used to reduce the speed and increase the transmitted torque, the reducer 1 being then arranged in a configuration called «direct configuration» so that the output shaft 3 rotates at an output rotational speed ω3 less than the input rotational speed ω2 of the input shaft 2 but by developing an output torque T3 greater than the input torque T2 exerted on said input shaft 2, or a multiplier mechanism, the reducer 1 being then arranged in a configuration called «reverse configuration» so that the output shaft 3 rotates faster than the input shaft 2, but by developing a torque T3 lower than that T2 provided to the input shaft 2.

Preferably, the reducer 1 will be a reversible mechanism selectively able to adopt either the direct configuration or the reverse configuration, simply by exchanging the roles of the input shaft 2 and of the output shaft 3.

For simplicity of description, it will be considered in the following that the reducer 1 is in a direct configuration, and takes over a function of reducing the rotational speed between the input shaft 2 and the output shaft 3.

Moreover, the reducer 1 has preferably a bi-directional operation, in that it can transmit both a clockwise rotational movement and, on the contrary, a counterclockwise rotational movement.

Of course, the reducer 1 according to the invention may be coupled to any movement (and force) transmission mechanical system, and more particularly be used at the output of any type of rotating machine, such as a motor, a turbine, a wind turbine or a marine turbine, or in combination with any type of motor-driven or manually driven rotary mechanism, such as a pedal, a winch (in particular crank winch), a clock movement (automatic winding), etc.

However, according to a particularly preferred variant of application, the reducer 1 according to the invention will be used within a power steering system 4, intended for a vehicle, preferentially for a motor vehicle, and will be preferably configured to ensure a reduction function within said power steering system 4.

Figure 1:
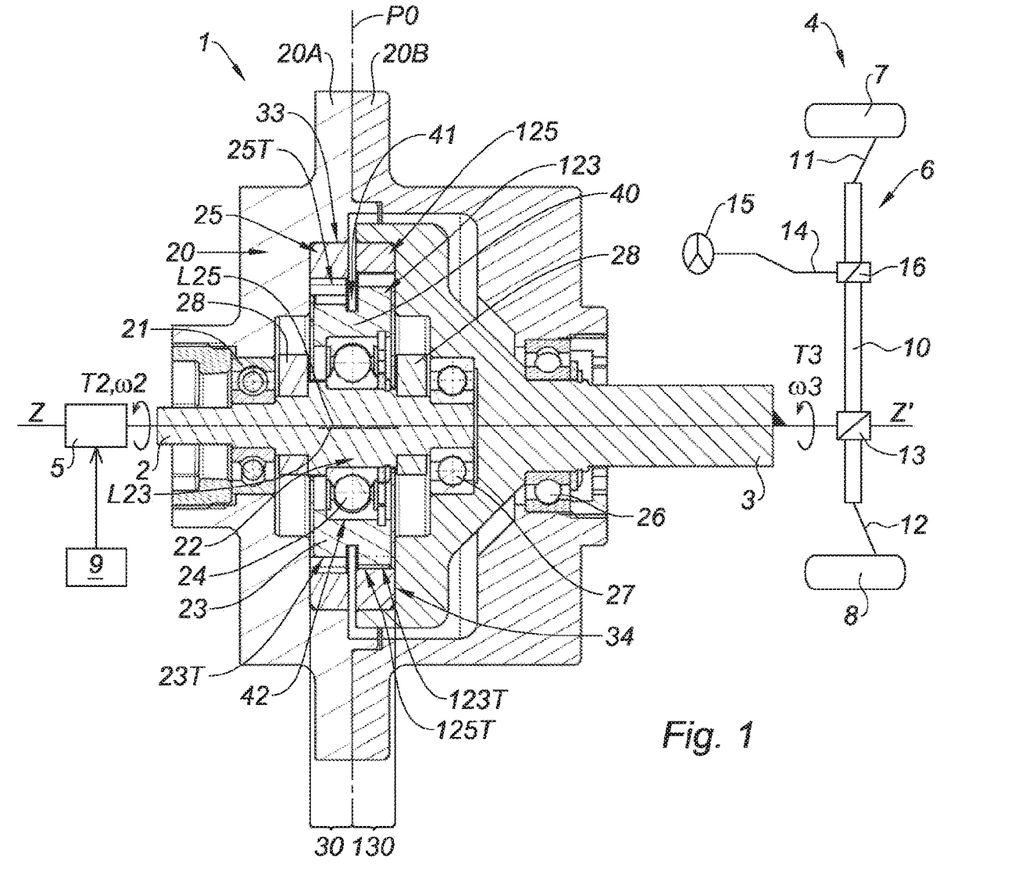
FIG. 1 illustrates, in a longitudinal sectional view along the main axis (ZZ'), a variant of a cycloidal reducer with two stages according to the invention, and a possible implantation of said reducer within a power steering system.

The invention therefore relates as such, as illustrated in FIG. 1, to a power steering system 4 that comprises an assist motor 5, a steering mechanism 6 that allows modifying the steering angle of one or several steering member(s) 7, 8, such as one or more steered wheels 7, 8, said power steering system 4 including a cycloidal reducer 1 according to any one of the variants of the invention to ensure a mechanical transmission between said assist motor 5, here connected to the input shaft 2, and the steering mechanism 6, here connected to the output shaft 3.

The assist motor 5 is preferably an electric motor with bi-directional rotation, which is electronically controlled, based on the predetermined assistance laws, by a computer 9 on-board the vehicle.

In a manner known per se, the steering mechanism 6 may include a rack 10, which is mounted in translation in a steering casing fixed to the frame of the vehicle, and which is connected to the steered wheels 7, 8 by tie rods 11, 12.

The output shaft 3 of the reducer 1 can then be advantageously connected to a first driving pinion 13 that meshes with said rack 10.

The steering mechanism 6 also preferably comprises a steering column 14 that carries a steering wheel 15 on which the driver acts to select the steering angle, and thus the heading of the vehicle.

According to a preferred variant, the steering mechanism 6 is a "dual pinion" mechanism, within which the steering column 14 meshes with the rack 10 by means of a second driving pinion 16, distinct and distant from the first driving pinion 13, as illustrated in FIG. 1.

According to the invention, and as illustrated in FIG. 1, the cycloidal reducer 1 comprises an input shaft 2 which is rotatably mounted in a reducer casing 20 along an axis called «main axis» (ZZ').

For this purpose, the input shaft 2 is carried and rotatably guided by at least one input bearing 21, such as a ball bearing, housed in the reducer casing 20.

The reducer 1 also comprises an eccentric member 22, such as a cam, which is carried by the input shaft 2 and rotatably driven by said input shaft 2.

Figure 4:
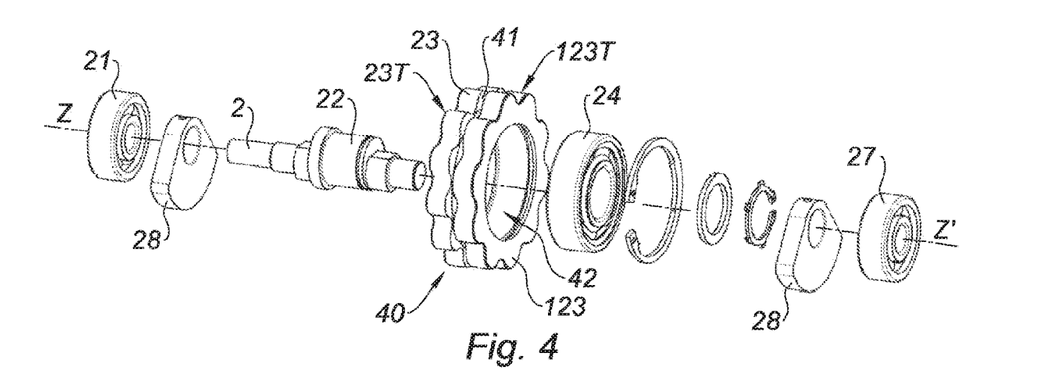
FIG. 4 illustrates, in an exploded perspective view, the detail of the cycloidal reduction stages of the reducer in FIGS. 1 to 3.

The eccentric member 22 may be formed by a separate part, of the cam type, which is added onto and fixed to the input shaft 2, or preferably, and as illustrated in FIGS. 1 and 4, said eccentric member 22 may be formed integrally with the input shaft 2.

The reducer 1 further comprises at least one cycloidal disc 23 which is rotatably mounted on the eccentric member 22, by means of an eccentric bearing 24, such as a ball bearing, said cycloidal disc 23 being provided, here on its radially outer perimeter, with a cycloidal toothing 23T.

The central axis of said cycloidal disc 23 will be noted L23.

Said central axis L23 is preferably parallel to the main axis (ZZ').

The cycloidal toothing 23T has, as its name indicates, substantially or even exactly a cycloid profile, said cycloid mathematically corresponding to the path followed by a fictitious point located on a fictitious generating circle that rolls without sliding on the radially outer perimeter of a base circle centered on the central axis L23, said base circle corresponding here to the toothing bottom circle of the cycloidal disc 23.

In this case, the lobes forming the toothing 23T of the disc 23 thus radially protrude in a centrifugal direction relative to the central axis L23 and relative to the toothing bottom circle of the disc 23.

The reducer 1 also comprises at least one crown 25 which is provided with a receiving toothing 25T with which the cycloidal toothing 23T of the cycloidal disc 23 meshes.

The receiving toothing 25T is also advantageously cycloidal, of a shape matching wih the toothing 23T of the disc 23, and has the same (gear) module as the toothing 23T of the disc 23, so as to allow the meshing.

Said receiving toothing 25 is generated on the radially inner perimeter of the crown 25, radially protruding in a centripetal manner towards the central axis L25 of the crown.

The central axis L25 of the crown 25 is preferably coincident with the main axis (ZZ'), so that the crown 25 is preferably coaxial with the input shaft 2.

Of course, the parameters used to define, in the form of parameterized curves, the cycloidal profiles of the toothings 23T, 25T according to the invention, such as the diameter of the pitch circle, the eccentricity or the diameter of the toothing bottom circle of the crown can be freely adjusted so as to adapt said toothing profiles, relative to a rigorously cycloidal theoretical profile, in order, for example, to minimize the stresses exerted on the teeth and to optimize the radial clearance allowing at the same time an easy assembly of the cycloidal gear and a smooth meshing.

In order to ensure the bearings necessary for the transmission of movement between the input shaft 2 and the cycloidal disc 23, the crown 25 is fixed in the reducer casing 20, for example by fixing screws, so as to be at least rotatably blocked about the main axis (ZZ'), and preferably so as to be totally secured to the reducer casing 20 (all degrees of freedom between the crown 25 and the reducer casing 20, in rotation and in translation, being then deleted).

Thus, the rotation $\omega 2$ of the input shaft 2 causes a rotation of the disc 23, about its central axis L23 (which coincides at all time with the axis of the eccentric member 22), under the combined action of the movement of the eccentric member 22, actuated by the rotation of the input shaft 2, and of the cooperation between the cycloidal toothing 23T of said disc 23 and the matching receiving cycloidal toothing 25T of the crown 25, which causes and guides a rolling without sliding (or almost without sliding) of the cycloidal disc 23 on the crown 25.

The reducer 1 finally comprises an output shaft 3, distinct from the input shaft 2, and which is arranged so as to be rotatably driven by the cycloidal disc 23.

Figure 2:
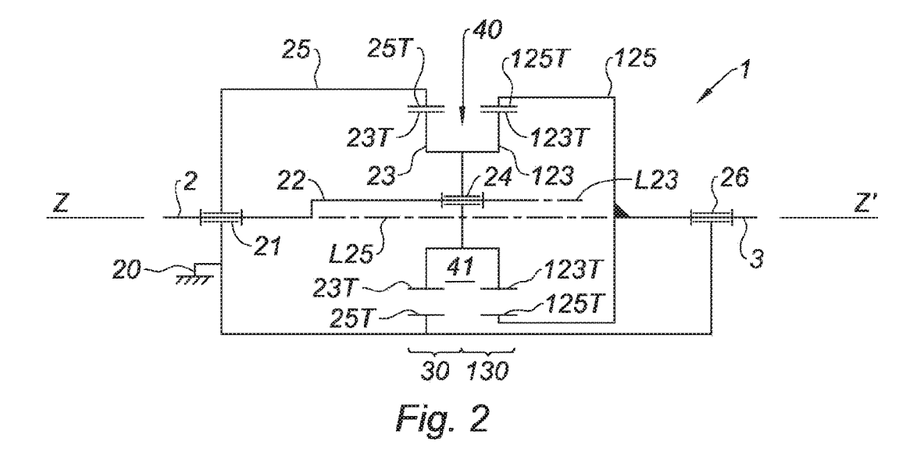
FIG. 2 illustrates, in the form of a kinematic scheme, the reducer in FIG. 1.

Although it is not excluded that the output shaft 3 is inclined relative to the input shaft 2, or even perpendicular thereto, and thus forms an angle, the output shaft 3 is preferably parallel to, and more particularly coaxial with, the input shaft 2, as shown in FIGS. 1 and 2.

The output shaft 3 will be advantageously supported and rotatably guided by at least one output bearing 26, such as a ball bearing, housed in the reducer casing 20.

Furthermore, preferably, the input shaft 2 will be articulated in pivot connection, or even in ball-joint connection, with the output shaft 3, by means of a link bearing 27, such as a ball bearing, here housed in the central hub of the output shaft 3, and coaxial with the input bearing 21, as illustrated in FIG. 1.

Moreover, as shown in FIG. 4, the input shaft 2 may comprise one or more flyweights 28 arranged to compensate for the mass imbalance caused by the eccentric member 22 and by the radial travel of the cycloidal disc 23 which is induced by the rotation of said eccentric member 22.

Thanks to these flyweights 28, we will avoid generating vibrations or causing premature wear of the reducer 1, and more particularly of the bearings 21, 24, 26, 27.

In order to facilitate the mounting of the reducer 1, the reducer casing 20 will be preferably subdivided, according to a parting line PO transverse to the main axis (ZZ'), into at least a first casing portion 20A (upstream), carrying here the input bearing 21 and the input shaft 2, and a second casing portion 20B (downstream) carrying the output bearing 26 and the output shaft 3.

According to the invention, and as well shown in FIGS. 3, 4 and 6 to 11, the cycloidal toothing 23T of the disc 23, as well as the corresponding receiving toothing 25T of the crown 25, are helical.

In other words, the lobes forming the teeth 23T, 25T of the cycloidal disc 23 and of the crown 25 are geometrically generated from a base cross-section (section considered in a sectional plane perpendicular to the central axis L23, L25), which here has a cycloid profile, and which scans a generatrix centerline that helically winds about the central axis L23, L25.

The teeth 23T, 25T are thus inclined, in side projection, by a predetermined helix angle β30 relative to the central axis L23, L25, as clearly shown in FIGS. 6, 7, 10 and 11.

Advantageously, the use of a helical toothing 23T, 25T allows a progressive and very spatially extended meshing, which promotes the smooth operation of the reducer 1 and deletes the jerks, shocks, and operating noises.

Figure 5:
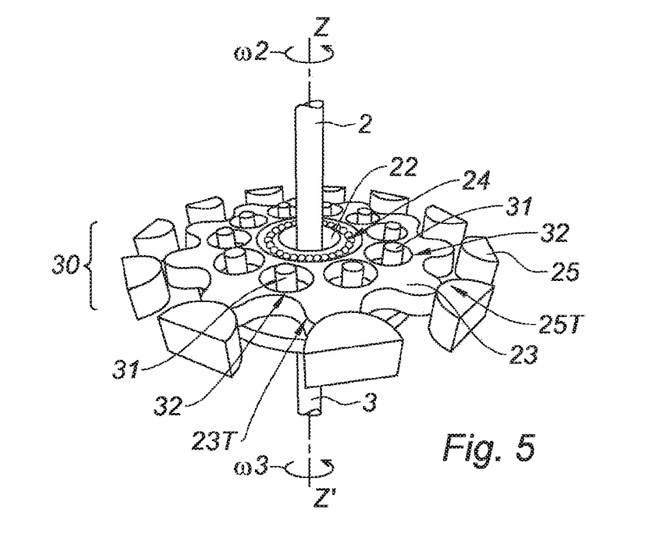
FIG. 5 illustrates, in a schematic perspective view, the principle of operation of a cycloidal reducer comprising a single reduction stage.

According to one possible arrangement corresponding to the variant illustrated in FIG. 5, the reducer 1 may form a cycloidal reducer with a single reduction stage 30, comprising a single cycloidal set within which a cycloidal disc 23 (possibly split into several cycloidal discs axially stacked against each other and fixed to one another) meshes with one and the same crown 25 (where appropriate common to the stack of discs 23).

According to such an arrangement with a single stage, the transmission of movement between the cycloid disc 23 (or the stack of cycloidal discs 23) and the output shaft 3 can be obtained, in a manner known per se, by providing on the output shaft 3 a plurality of rectilinear coupling fingers 31, parallel to the main axis (ZZ') and disposed in a circle about the main axis (ZZ'), at regular intervals, said coupling fingers 31 each cooperating with a circular coupling orifice 32 dug in the cycloidal disc 23.

The coupling orifices 32, distributed in a circle and at regular intervals about the central axis L23 of the cycloidal disc 23, have a diameter greater than that of the coupling fingers 31, so as to be able to absorb the component of the radial travel of the disc 23 relative to the output shaft 3 (that is to say, the component of the movement perpendicular to the central axis (ZZ'), which is induced by the rotation of the eccentric member 22), while transmitting a component of rotation $\omega 3$.

Of course, as an alternative, the coupling fingers 31 may be carried by the disc 23, and the coupling orifices 32 by the output shaft.

However, according to another particularly preferred possible arrangement, corresponding to the variant illustrated in FIGS. 1 to 4 and 6 to 10, the cycloidal reducer 1 includes two reduction stages 30, 130.

Advantageously, the use of a dual reduction stage allows obtaining a very high reduction ratio $R=\omega 2/\omega 3$, typically equal to or greater than 40, 50 or even 100, while preserving a good compactness, and in particular a low axial bulk along the main axis (ZZ'), of the reducer 1.

In other words, the multiplication of cycloidal reduction stages allows increasing the «density» of the reducer 1, by considerably increasing the reduction ratio while preserving a lightweight and compact reducer.

Such a dual-stage reducer 1 includes firstly a first reduction stage 30, which comprises the eccentric member 22, a first cycloidal disc 23, called «input disc», rotatably mounted on said eccentric member 22 (which is in turn rotatably driven by the input shaft 2) and which is provided with a first cycloidal toothing 23T, as well as a first crown 25, called «input crown» which is secured to the reducer casing 20 and which is provided with a first cycloidal receiving toothing 25T with which the first cycloidal toothing 23T of the input disc 23 meshes, as described above.

The input crown 25 may be fixed, for example by screwing, in the reducer casing 20, and more particularly in a counterbore 33 of the upstream portion 20A thereof, which facilitates in particular the centering and the radial support of said input crown 25.

Said reducer 1 also includes a second reduction stage 130, which comprises a second cycloidal disc 123, called «output disc», which is rotatably secured to the input disc 23, and preferably formed integrally with said input disc 2, and which is provided with a second cycloidal toothing 123T, said second reduction stage 130 also comprising a second crown 125, called «output crown», which is distinct from the input crown 25 (and axially distant from said input crown 25), which is rotatably secured to the output shaft 3 (so as to be able to drive in rotation said output shaft 3, and/or be rotatably driven by the latter), and which is provided with a second cycloidal receiving toothing 125T with which the second cycloidal toothing 123T of the output disc 123 meshes.

Figure 6:
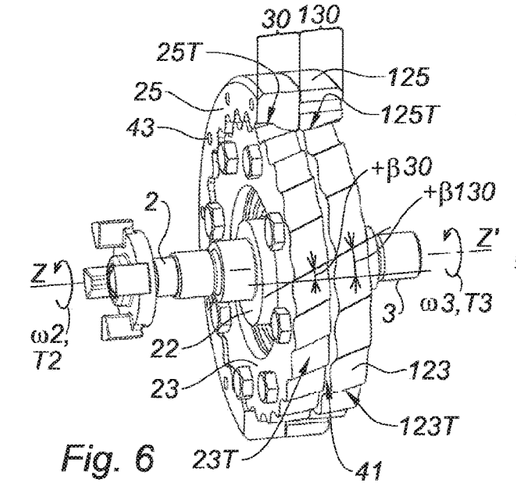
FIGS. 6 and 7 illustrate, in perspective views with material pullout, the detail of a reduction sub-set comprising two reduction stages and usable within the reducer of FIGS. 1 to 4.

By «rotatably secured», it is indicated that the output disc 123 is coupled, and more preferentially fixed (for example by means of fixing screws, as shown in FIG. 6), to the input disc 23 in such a way that the rotation of the input disc 23, and more generally the movement of the input disc 23 (relative to the reducer casing 20), is transmitted identically to the output disc 123, in a same overall movement.

It will be noted that the number Z23 of teeth (that is to say the number of cycloidal lobes) of the input disc 23 may be different from the number Z123 of teeth of the output disc 123, and preferably strictly greater than the latter, that is to say, there will be: Z23>Z123.

Moreover, the number Z25, Z125 of teeth of a crown 25, 125 will be greater, preferably by one unit (by one tooth), than the number of teeth Z23, Z123 of the corresponding disc 23, 123.

Thus, there will be Z25=Z23+1 and Z125=Z123+1.

Within the dual reduction stage reducer 1, the reduction ratio R=ω2/ω3 will be given by the formula:

$$1/R = 1 - (Z25 \times Z123)/(Z23 \times Z125).$$

The number of teeth of the various discs 23, 123 and crowns 25, 125 will be advantageously selected depending on the desired reduction ratio.

By way of example, by selecting Z23=25 and Z123=18, and consequently Z25=26 and Z125=19, a reduction ratio R=67.9 is substantially obtained.

Figure 3:
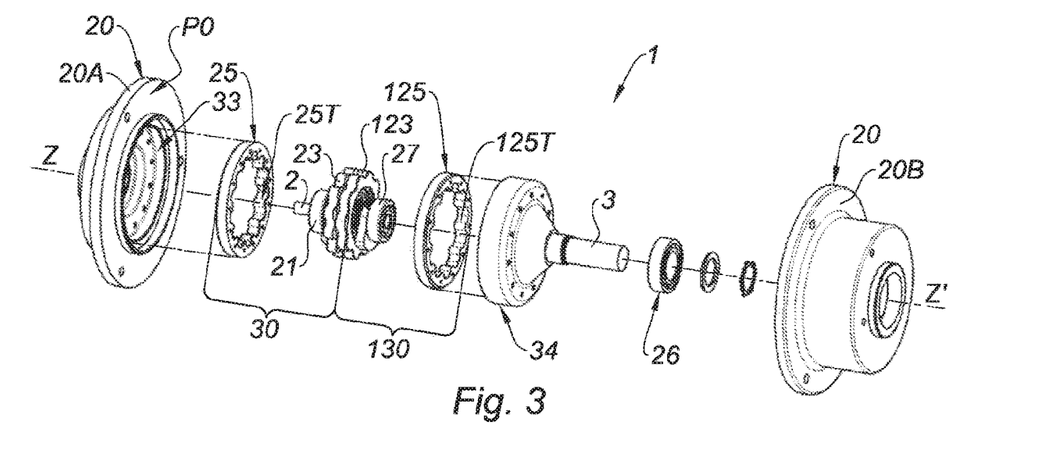
FIG. 3 illustrates, in an exploded perspective view, the reducer in FIGS. 1 and 2.

The output crown 125, rotatably movable about the main axis (ZZ') relative to the reducer casing 20, may be added onto and fixed to, for example by screwing, one end of the output shaft 3, which may form to this end a bearing flange 34, preferably shouldered to facilitate the centering of said output crown 125, as illustrated in FIGS. 1 and 3.

Within such a reducer 1 with two reduction stages 30, 130, at least one of the two stages, and preferably each of the two stages, uses a helical cycloidal toothing. In other words, and particularly preferentially, the cycloidal toothings 23T, 25T, 123T, 125T, on the one hand, of the input disc 23 and of the input crown 25 and, on the other hand, of the output disc 123 and of the output crown 125, are helical and as such have respectively a helix angle called «input helix angle» β30 and a helix angle called «output helix angle» β130, as well shown in FIGS. 6 and 10.

Said helix angles β30, β130 characterize the inclination of the teeth relative to the central axis L23, L25 of their respective disc 23, 123 or crown 25, 125, and more generally relative to the main axis (ZZ') to which said central axes are preferably parallel.

Advantageously, all of the cycloidal reduction stages 30, 130 of the reducer 1 thus have a smooth and quiet operation.

Figures 10, 11:
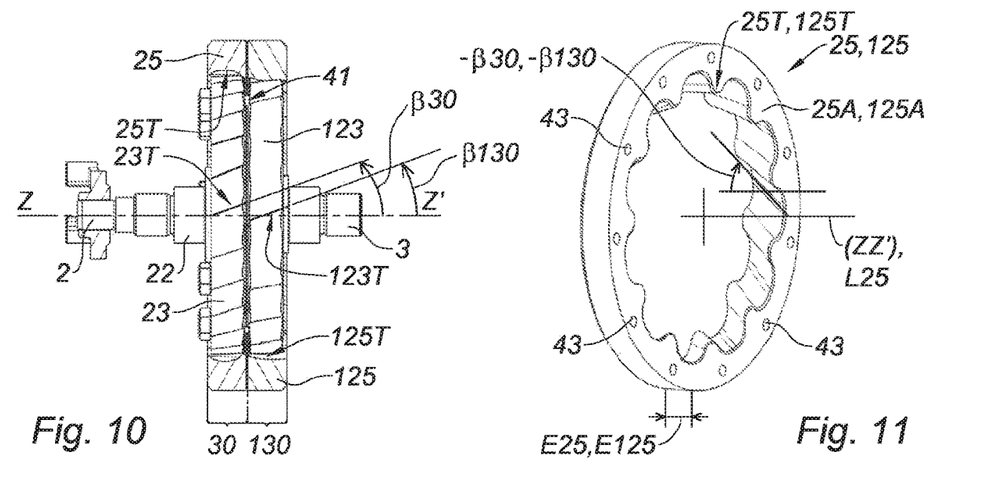
FIG. 10 illustrates a side view of the reduction sub-set, with material pullout, in FIG. 7.
FIG. 11 represents a detailed perspective view of a crown with helical cycloidal toothing according to the invention, used within the reducer in FIGS. 1 to 4 and 6 to 10.

Preferably, and as well shown in FIGS. 6 and 10, the input helix angle β330 and the output helix angle β130 are oriented in the same direction relative to the main axis (ZZ'), so that the first reduction stage 30 and the second reduction stage 130 are arranged in an arrangement with substantially parallel toothings 23T, 25T, respectively 123T, 125T.

More particularly, the helix angle of the input disc 23 (conventionally +β30) has the same sign as the helix angle of the output disc 123 (conventionally +β130), that is to say is inclined in the same direction relative to the main axis (ZZ'), or even substantially parallel to (and therefore of the same sign and of the same value as) the helix angle of the output disc 123 while, respectively, the helix angle of the input crown 25 (conventionally −β30 because it is of the same value as the helix angle of the input disc 23, but of opposite sign by necessity of construction) has the same sign as the helix angle of the output crown 125 (conventionally −β130), or even substantially parallel to said helix angle of the output crown 125.

Advantageously, unlike a herringbone arrangement, a (substantially) parallel arrangement of the toothings, that is to say an arrangement in which the helix angle β30 of the first stage 30 and the helix angle β130 of the second stage 130 are of the same sign, that is to say have the same direction of inclination relative to the main axis (ZZ'), allows the reducer 1 itself to handle the axial forces that are produced by the inclination of the helical toothings.

Thus, it is possible to limit, or even substantially cancel, the axial force resultant that is generated along the main axis (ZZ') because of the use of the helical toothings, which avoids having to handle such an axial force component by bearings (rollings) external to the reducer 1.

The reducer 1 can thus be advantageously implanted within the power steering system 4 without the need to modify or otherwise reinforce the steering mechanism 6.

In absolute terms, it is possible to have rigorously parallel helix angles between the first stage 30 and the second stage 30, that is to say: β30=β130 (therefore +β30=+β130 and −β30=−β130).

However, according to one preferred possible arrangement, the value (amplitude) of the input helix angle β30 is different from the value (amplitude) of the output helix angle β130.

More particularly, these two helix angle β30, β130 values are preferably adjusted so as to obtain, in particular with regard to the number of teeth Z23, Z123 and to the respective module m23, m123 of each cycloidal disc 23, 123, an optimized compensation of the axial forces.

Indeed, for a helical gear of a helix angle β having a primitive radius r (with r=½*m*Z, where m is the module and Z the number of teeth), the axial force component Fa generated is: Fa=T*sin(β)/r=2*T*sin(β)/(m*Z), where T represents the transmitted torque.

By applying this formula to each reduction stage 30, 130, a relationship between the input helix angle β30 and the output helix angle β130 can be expressed, which allows each stage 30, 130 to neutralize the axial force generated by the other stage 130, 30.

More particularly, it will be possible to calculate the output helix angle β130 as follows:

$$\sin \beta 130 = \sin \beta 30 \cdot (m123 \cdot Z123)/(m23 \cdot Z23)$$

By way of example, an output disc 123 having a helix angle β130=25.33 deg, a module m123=4.5 mm and a number of teeth Z123=18, can compensate the axial forces generated by an input disc 23 having a helix angle β30 of 25.00 deg, a module m23=3.2 mm and a number of teeth Z23=25.

Moreover, the majority of teeth (cycloidal lobes), and preferably the totality of teeth, which constitute the receiving toothing 25T, 125T of the crown(s) 25, 125 are preferably formed integrally with their respective crown 25, 125.

Such a monolithic arrangement of the toothings 25T, 125T will allow, by comparison with the old toothings made by a set of individual pins, to increase the robustness of the crowns 25, 125 and, especially, to improve the accuracy of (helical) shaping of the teeth and the accuracy of positioning of said teeth relative to each other, which will improve the quality of the meshing while allowing to significantly reduce the time of manufacture needed to assemble the reducer 1.

The shaping of the toothings 25T, 125T, and more generally of the crowns (in the form of closed rings that surround the central axis L25 of the crown, and therefore the main axis (ZZ'), continuously over 360 degrees), can be performed for example by molding and/or cutting.

The material used to manufacture the crowns 25, 125, and their respective toothings 25T, 125T, may be steel, optionally treated (for example by heat treatment) to increase its surface hardness and/or reduce its coefficient of friction relative to the cycloidal disc 23, 123.

It will be noted that the same will preferably apply for each cycloidal disc 23, 123, whose majority and preferably totality of teeth forming the toothing 23T, 123T will be preferentially formed integrally, for example by molding and/or cutting, with the concerned disc 23, 123.

Moreover, the input disc 23 and the output disc 123 will be preferably securely joined together to form a sub-set 40 of disc, animated by the same overall movement (relative to the reducer casing 20).

Figure 7:
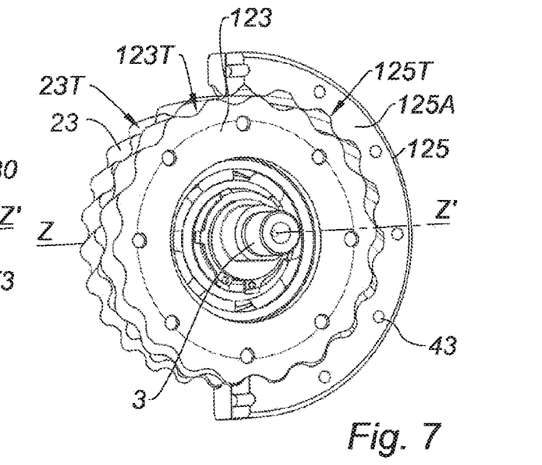
Figure 8:
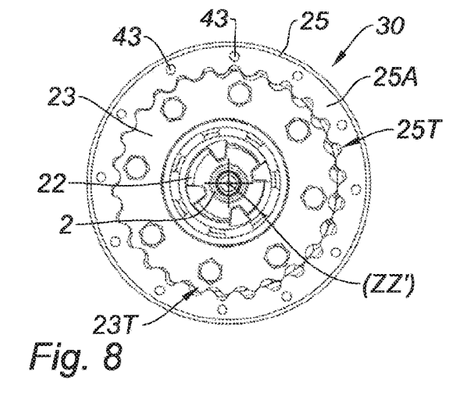
FIGS. 8 and 9 illustrate, according to projection views normal to the main axis (ZZ'), the reduction sub-set of FIGS. 6 and 7 seen respectively from the first reduction stage (input) and from the second reduction stage (output).
Figure 9:
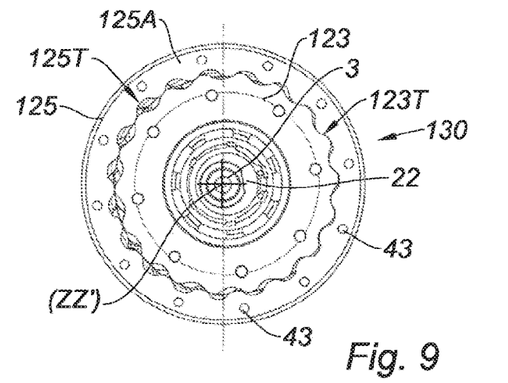

According to one possibility of embodiment, the input disc 23 and the output disc 123 may be manufactured as separate parts, then assembled to one another in order to form said sub-set, for example by fixing screws, as illustrated in FIGS. 6 and 7.

However, according to one preferred possibility of embodiment, the input disc 23 and the output disc 123, with their respective toothings 23T, 123T, may be formed integrally with each other, so as to constitute a single monolithic sub-set 40, each disc 23, 123 of which forms preferably an axial end, as illustrated in FIG. 1.

Preferably, there will be provided a groove 41 which will axially separate, in a partial manner, the input disc 23 from the output disc 123, at least over a radius range (relative to the central axis L23 common to both discs) that covers the annular sector that corresponds to the height of the toothings 23T, 123T, as well shown in FIGS. 1 and 4.

Said groove 41 materializes the axial separation between the two reduction stages 30, 130 and advantageously allows avoiding that the input disc 23 interferes or meshes with the output crown 125 and, conversely, that the output disc 123 interferes or meshes with the input crown 25.

Furthermore, such a groove 41 can form a tool release facilitating the cutting or the grinding of the toothings 23T, 123T of the discs 23, 123.

The sub-set 40 of discs will preferably further comprise a tubular central housing 42 designed to accommodate, in a fit-mounting, the eccentric member 22 and the eccentric bearing 24.

The disc(s) 23, 123, and therefore more generally the sub-set 40, can for example be made of steel that may be optionally treated (for example by heat treatment) to increase its surface hardness and/or reduce its coefficient of friction.

Of course, the invention also concerns, as such, the cycloidal "spare parts" with helical toothing allowing to make one or both of the reduction stages 30, 130.

Thus, the invention also concerns a cycloidal disc 23, 123 for a cycloidal gear reducer 1, according to any one of the variants of the invention, said cycloidal disc 23, 123 comprising on its periphery, preferably integrally (and over the entire circumference of said disc, by 360 degrees about its central axis L23), a helical cycloidal toothing 23T, 123T.

The invention concerns more particularly a sub-set 40 of a two-stage 30, 130 cycloidal disc, preferably formed in one-piece, comprising, preferably integrally, a first cycloidal disc 23, having a first helical cycloidal toothing 23T, and a second cycloidal disc 123, having a second helical cycloidal toothing 123T, axially stacked, said first and second discs 23 being preferably partially separated from each other by a groove 41, and their toothings having preferably helix angles β30, β130 of the same sign, or even parallel.

Similarly, the invention also relates to a cycloidal crown 25, 125 for a cycloidal gear reducer 1 according to any one of the variants of the invention, said crown 25, 125 comprising an annular rim 25A, 125A on the inner periphery from which is formed, preferably integrally, a helical cycloidal toothing 25T, 125T, as illustrated in particular in FIG. 11.

Preferably, said crown 25, 125 is formed in a material "wafer" of a constant (axial) thickness E25, E125 whose end faces are substantially normal to the central axis L25.

Preferably, said crown 25, 125, and more particularly its annular rim 25A, 125A, is pierced with fixing holes 43 allowing fixing, for example by screwing, the (input) crown 25 on the reducer casing 20, respectively the (output) crown 125 on the output shaft 3.

Of course, the invention is in no way limited to the sole variants described in the foregoing, those skilled in the art being in particular capable of freely isolating or combining together either one of the aforementioned features, or substituting them with equivalents.

The invention claimed is:

1. A cycloidal gear reducer comprising:
   an input shaft rotatably mounted in a reducer casing along a main axis,
   an eccentric member carried by the input shaft and rotatably driven by the input shaft,
   at least one cycloidal disc rotatably mounted on the eccentric member and provided with a cycloidal toothing,
   at least one crown provided with a receiving toothing with which the cycloidal toothing of the cycloidal disc meshes, and
   an output shaft, distinct from the input shaft arranged to be rotatably driven by the cycloidal disc,
   wherein the cycloidal toothing of the disc and the corresponding receiving toothing of the crown are helical,
   wherein the reducer includes two reduction stages, including (i) a first reduction stage which comprises the eccentric member, a cycloidal input disc, which is rotatably mounted on the eccentric member and which is provided with a first cycloidal toothing, as well as an input crown, which is secured to the reducer casing and which is provided with a first cycloidal receiving toothing with which the first cycloidal toothing of the input disc meshes, and (ii) a second reduction stage which comprises a cycloidal output disc, which is rotatably secured to the input disc, and which is provided with a second cycloidal toothing, the second reduction stage also comprising an output crown, which is distinct from the input crown, which is rotatably secured to the output shaft and which is provided with a second cycloidal receiving toothing with which the second cycloidal toothing of the output disc meshes, and wherein the first cycloidal toothing of the input disc and the first cycloidal receiving toothing of the input crown have an input helix angle, and the second cycloidal toothing of the output disc and the second cycloidal receiving toothing of the output crown have an output helix angle, and wherein the input helix angle and the output helix angle are oriented in the same direction relative to the main axis, so that the first and the second reduction stages are arranged in an arrangement with substantially parallel toothings.

2. The reducer according to claim 1 wherein the value of the input helix angle is different from the value of the output helix angle.

3. The reducer according to claim 1 wherein the majority of teeth that constitute the receiving toothing of the crown(s) are formed integrally with their respective crown.

4. A power steering system comprising an assist motor, a steering mechanism allowing to modify the steering angle of one or more steering member(s), the power steering system comprising a cycloidal reducer according to claim 1 to ensure a mechanical transmission between the assist motor and the steering mechanism.

5. The reducer according to claim 1 wherein the output helix angle is calculated as follows:

$$\sin \beta 130 = \sin \beta 30 * (m123 * Z123)/(m23 * Z23),$$

where:
$\beta 130$ represents the output helix angle,
$\beta 30$ represents the input helix angle,
$m123$ represents a module of the output disc,
$Z123$ represents a number of teeth of the output disc,
$m23$ represents a module of the input disc, and
$Z23$ represents a number of teeth of the input disc.

* * * * *